United States Patent Office

3,208,858
Patented Sept. 28, 1965

3,208,858
CONFECTIONERY PRODUCT CONTAINING A FATTY ACID ESTER OF A MONOHYDRIC ALCOHOL
Antony Crossley, Bromborough, and Alfred Thomas, New Ferry, England, assignors to Lever Brothers Company, New York, N.Y., a corporation of Maine
No Drawing. Filed Oct. 16, 1961, Ser. No. 145,485
Claims priority, application Great Britain, Oct. 21, 1960, 36,167/60
12 Claims. (Cl. 99—134)

This invention relates to confectionery products and especially to confectionery products composed largely of sugar, including sweets (candies), icings and fillings for biscuits and cakes.

The invention provides a new kind of composition for formulating products of the kind referred to above, the composition being substantially free of any ingredient which does not dissolve in the mouth. In the preferred compositions of the invention, the major constituent, apart from the sugar, is ethyl palmitate. (When ethyl palmitate is referred to in the specification, an ethyl palmitate of at least 95% purity is to be understood.) Products made from these compositions melt in the mouth producing a remarkable sensation of coolness. To obtain the maximum cool-melting effect, ethyl palmitate should be the sole constituent of the composition other than the sugar and such conventional minor constituents of sweets as flavouring agents and colouring agents.

Ethyl esters of other saturated fatty acids containing 14 to 20 carbon atoms are far less effective than ethyl palmitate and if used in admixture therewith or with one another, may, besides impairing the cool-melting effect, soften the product at ordinary temperatures. Useful compositions (though much inferior to the preferred compositions) are, however, obtainable by using instead of ethyl palmitate, mixtures thereof with ethyl stearate, the proportion of the latter in the mixture being either from more than 0 to 10% (preferably 1 to 5%), or between 40 and 70% by weight (preferably 55 to 65%). Mixtures of compositions substantially outside these ranges are generally unsatisfactory. Suitable mixtures of ethyl stearate and ethyl palmitate can be obtained by esterifying ethanol with the mixed acids from fully hardened palm oil. Other esters of these acids with monohydric alcohols, especially alcohols containing 2 to 4 carbon atoms, for example, n-propyl, isopropyl and n-butyl palmitates and stearates, may also be used but with less advantage. In all these mixtures care must be taken to avoid such proportions as to give eutectic mixtures and to ensure that the mixture is sufficiently high melting to avoid undue softness at ordinary atmospheric temperatures but yet melts sharply in the mouth. Fats, if present at all in the compositions, should be in such proportions as to avoid the production of undesirably low melting compositions through eutectic formation, and preferably be in lower proportions than the alkyl esters and be sharp-melting in the mouth. Among fats that come into consideration for this purpose are: cocoa butter, Borneo tallow, shea butter, palm kernel oil, the stearins of these fats and of coconut oil and the palm oil fractions referred to in British patent specification No. 827,172.

The sugar present in the composition may consist of sucrose or other palatable sugars. Mixtures of edible sugars such as sucrose with glucose, fructose or lactose may also be used.

The following are examples of compositions according to the invention, all the parts being by weight.

*Example 1*

| | Parts |
|---|---|
| Ethyl palmitate | 40 |
| Icing sugar | 30 |
| Glucose | 30 |

*Example 2*

| | Parts |
|---|---|
| Ethyl stearate | 24 |
| Ethyl palmitate | 16 |
| Icing sugar | 60 |

*Example 3*

A composition was made according to Example 1, but substituting for the ethyl palmitate a mixture of ethyl esters obtained by esterifying ethanol through conventional procedures with a mixture of acids obtained by hydrolysis of fully hardened palm oil, said mixture of acids having approximately the following percentage composition:

| | |
|---|---|
| $C_{14}$ acid | 2 |
| Palmitic acid | 37 |
| Stearic acid | 60.5 |
| $C_{18}$ unsaturated acid | 0.5 or less |

*Example 4*

A composition was made according to Example 3 but using a mixture of ethyl esters obtained by esterifying a mixture of acids of approximately the following percentage composition:

| | |
|---|---|
| $C_{12}$ acid | 1.5 |
| $C_{14}$ acid | 2.5 |
| Palmitic acid | 37.5 |
| Stearic acid | 56.0 |
| $C_{20}$ acid | 2.0 |

*Example 5*

A composition was made as in Example 3 but using a mixture of ethyl esters obtained by esterifying a mixture of acids of approximately the following percentage composition:

| | |
|---|---|
| Palmitic acid | 30.5 |
| Stearic acid | 65.0 |
| $C_{20}$ and higher acids | 4.5 |

The compositions of the invention can be formed into sweets by any suitable method, for example by melting them and forming the molten material into pellets by means of a drop plate, or by molding. The sweets may with advantage be provided with a thin edible coating serving to protect them against becoming sticky at atmospheric temperatures. Preferably the coating is applied while the pellet is at a sufficiently low temperature to be quite hard. A suitable coating composition for application under such conditions is "royal icing," which comprises a mixture of icing sugar and a bonding agent such as egg white, to which a small proportion of water is added.

The following example illustrates the production of sweets according to the invention:

Example 6

The composition described in Example 1 was melted and run through a drop plate to form pellets of ½" diameter. The pellets were cooled to 0° C. and kept at that temperature overnight. They were then coated with the following composition (the parts being by weight).

| | Parts |
|---|---|
| Icing sugar | 81 |
| Egg white | 11 |
| Water | 8 |

The compositions of Examples 1 to 5 can with advantage be applied as coatings on wafers or fillings for biscuits. They can also be used as fillings for chocolates of the kind having an outer casing of coverture chocolate made in two parts which are cemented together after filling the cavity with a composition which is softer than the chocolate. Before filling the casing with the composition, it is advantageous to provide the inner surface of the casing with a suitable coating to prevent direct contact between the coverture chocolate and the composition. A coating of sugar is satisfactory for this purpose. Gelatin capsules may also be filled with the compositions of the invention.

Fillers, such as corn-flour, arrowroot and skim milk powder can be present in the compositions of the invention but with some sacrifice of the cool-melting effect which decreases as the proportion of filler is increased. The following is an example of a composition containing such a filler:

Example 7

| | Parts |
|---|---|
| Ethyl palmitate | 38 |
| Filler | 22 |
| Icing sugar | 39.85 |
| Lecithin | 0.15 |

This composition can be flavoured with raspberry essence and coloured with a suitable red dye.

In the preferred compositions of the invention at least the major part of the composition is composed of a mixture of sweetening agent (in particular sugar) with the edible ester of the monohydric alcohol (in particular ethyl palmitate or a non-eutectic mixture thereof with ethyl stearate) the ester amounting to at 30 to 50% of the weight of the composition.

It will occur to those skilled in the art that there are many modifications to the invention as specifically described herein. For example, the fatty acid esters of this invention can be mixed with artificial sweetening agents such as saccharin or the cyclamate salts to provide dietetic or low-calorie preparations. It is intended to include all such modifications within the scope of the appended claims.

We claim:

1. A confectionery composition which produces a cool sensation upon melting in the mouth, said composition being composed substantially of a palatable sugar in admixture with an ester of a monohydric alcohol having 2 to 4 carbon atoms and a saturated fatty acid having 14 to 20 carbon atoms, the ester amounting to at least 30% of the weight of the composition and the composition being substantially free from any ingredient which does not dissolve in the mouth.

2. A composition according to claim 1 in which the ester is composed substantially of a non-eutectic mixture of ethyl palmitate and ethyl stearate, the percentage of ethyl stearate being in a range selected from the ranges of more than 0 to 10% and 40 to 70%.

3. A composition according to claim 1 in which the ester is composed substantially of a non-eutectic mixture of ethyl palmitate and ethyl stearate, said non-eutectic mixture being an esterification product of ethanol and the fatty acids from fully hardened palm oil.

4. A confectionery product comprising a pellet of the composition specified in claim 1, said pellet having a coating of a hard icing.

5. A confectionery product comprising a pellet of the composition specified in claim 1, said pellet having a coating of a hard icing composed substantially of icing sugar and egg white.

6. A confectionery product comprising a pellet of the composition specified in claim 1, wherein the ester is composed substantially of ethyl palmitate, said pellet having a coating of a hard icing.

7. A composition according to claim 1 in which the ester is composed substantially of ethyl palmitate.

8. A composition according to claim 1 in which the ester is composed substantially of a non-eutectic mixture of ethyl palmitate and ethyl stearate.

9. A composition according to claim 1 in which an edible filler is present therein.

10. A composition according to claim 9 wherein the filler is selected from the group consisting of corn-flour, arrowroot, and skim milk powder.

11. A confectionery composition solid at ordinary temperatures, at least the major proportion of said composition consisting of a mixture of at least one edible ester of a monohydric alcohol having 2 to 4 carbon atoms and a saturated fatty acid having 14 to 20 carbon atoms and at least one sweetening agent and having by virtue of its content of said ester a cool taste.

12. A composition according to claim 11, wherein the ester is composed substantially of a non-eutectic mixture of ethyl palmitate and ethyl stearate, the percentage of ethyl stearate being in a range selected from the ranges of more than 0 to 10% and 40 to 70% and the sweetening agent is composed substantially of palatable sugar, the said sub-mixture amounting to 30 to 50% of the weight of the composition.

References Cited by the Examiner

UNITED STATES PATENTS

| 1,725,608 | 8/29 | Zebulske | 99—134 X |
| 2,759,955 | 8/56 | Braconier et al. | 260—410.9 |

OTHER REFERENCES

J. Agri. Chem. Soc. (Japan), 25 (1951–52), pages 206–10.

"The Chemical Senses," by Moncrieff, Leonard Hill Limited, 17 Stratford Place, W.I. London, 1944, pages 185–188.

A. LOUIS MONACELL, *Primary Examiner.*

BEATRICE H. STRIZAK, *Examiner.*